United States Patent [19]
Stringaro et al.

[11] Patent Number: 5,240,663
[45] Date of Patent: Aug. 31, 1993

[54] METHOD, APPARATUS AND EXTRUSION NOZZLE FOR PRODUCING A MEMBER FROM EXTRUDABLE MATERIAL

[75] Inventors: Jean-Paul Stringaro, Bulach; Alex Pfeiffer, Sins, both of Switzerland

[73] Assignee: Sulzer Brothers Limited, Winterthur, Switzerland

[21] Appl. No.: 675,894

[22] PCT Filed: Sep. 17, 1990

[86] PCT No.: PCT/CH90/00220
§ 371 Date: Apr. 22, 1991
§ 102(e) Date: Apr. 22, 1991

[87] PCT Pub. No.: WO91/04141
PCT Pub. Date: Apr. 4, 1991

[30] Foreign Application Priority Data
Sep. 20, 1989 [CH] Switzerland .................. 03427/89

[51] Int. Cl.$^5$ .............................................. B29C 47/18
[52] U.S. Cl. ................................. 264/150; 264/167;
264/177.11; 264/177.12; 264/209.2; 264/209.8;
264/211.11; 264/211.12; 425/142; 425/308;
425/381; 425/150; 425/465; 425/466
[58] Field of Search ............... 264/167, 150, 209.2,
264/209.8, 177.11, 177.12, 211.11, 211.12;
425/465–467, 381, 382.3, 308, 142, 150;
428/35.1

[56] References Cited
U.S. PATENT DOCUMENTS

| 3,019,483 | 2/1962 | Schultheiss | 264/167 |
| 3,137,602 | 6/1964 | Lincoln | 264/150 |
| 3,235,439 | 2/1966 | Schultheiss | 161/69 |
| 3,616,018 | 10/1971 | Komoly | 156/244 |
| 3,932,090 | 1/1976 | Brumlik | 425/381 |
| 4,001,366 | 1/1977 | Brumlik | 264/148 |
| 4,338,273 | 7/1982 | Schnedecker | 425/465 |
| 4,419,315 | 12/1983 | Kessler | 425/381 |
| 4,421,702 | 12/1983 | Oda et al. | 264/209.8 |
| 4,746,479 | 5/1988 | Hanaki et al. | 264/150 |
| 4,881,883 | 11/1989 | Michimoto et al. | 425/142 |

FOREIGN PATENT DOCUMENTS 2527787 1/1976 Fed. Rep. of Germany .
WO87/06181 10/1987 World Int. Prop. O. .

Primary Examiner—Jeffery Thurlow
Attorney, Agent, or Firm—Kenyon & Kenyon

[57] ABSTRACT

The method and apparatus for producing members (4) of extrudable material, for example a ceramic or synthetic plastic material, use a nozzle (2) composed of a plurality of segments (21 to 25) abutting without gaps and having extrusion ducts (28), segments (21, 22) of the nozzle being moved relative to one another, for example transversely relative to the direction of extrusion. With this method and apparatus it is possible to produce in a single operation members of which the structures, such as open ducts (40), change their relative positions and cross one another.

24 Claims, 6 Drawing Sheets

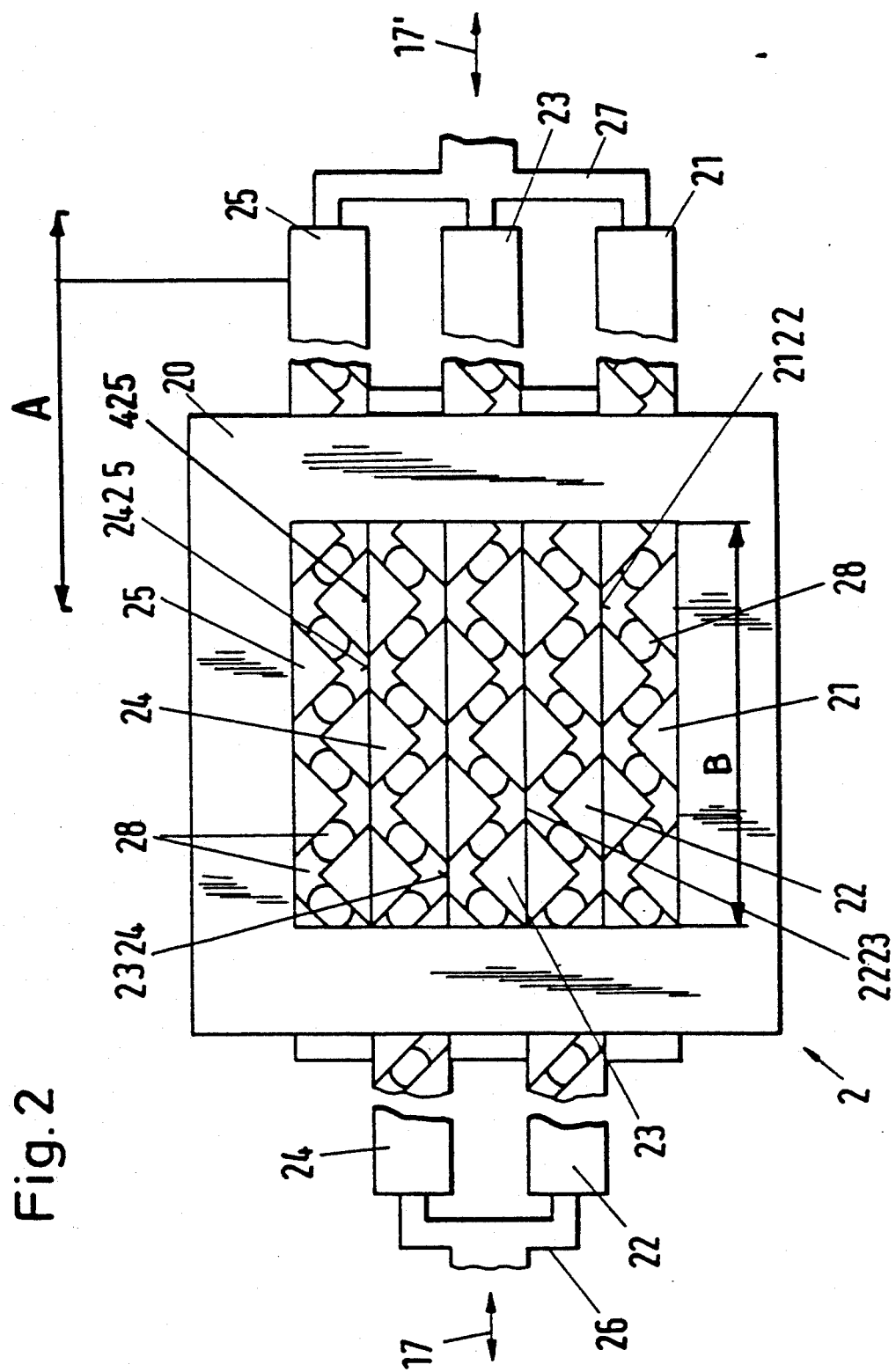

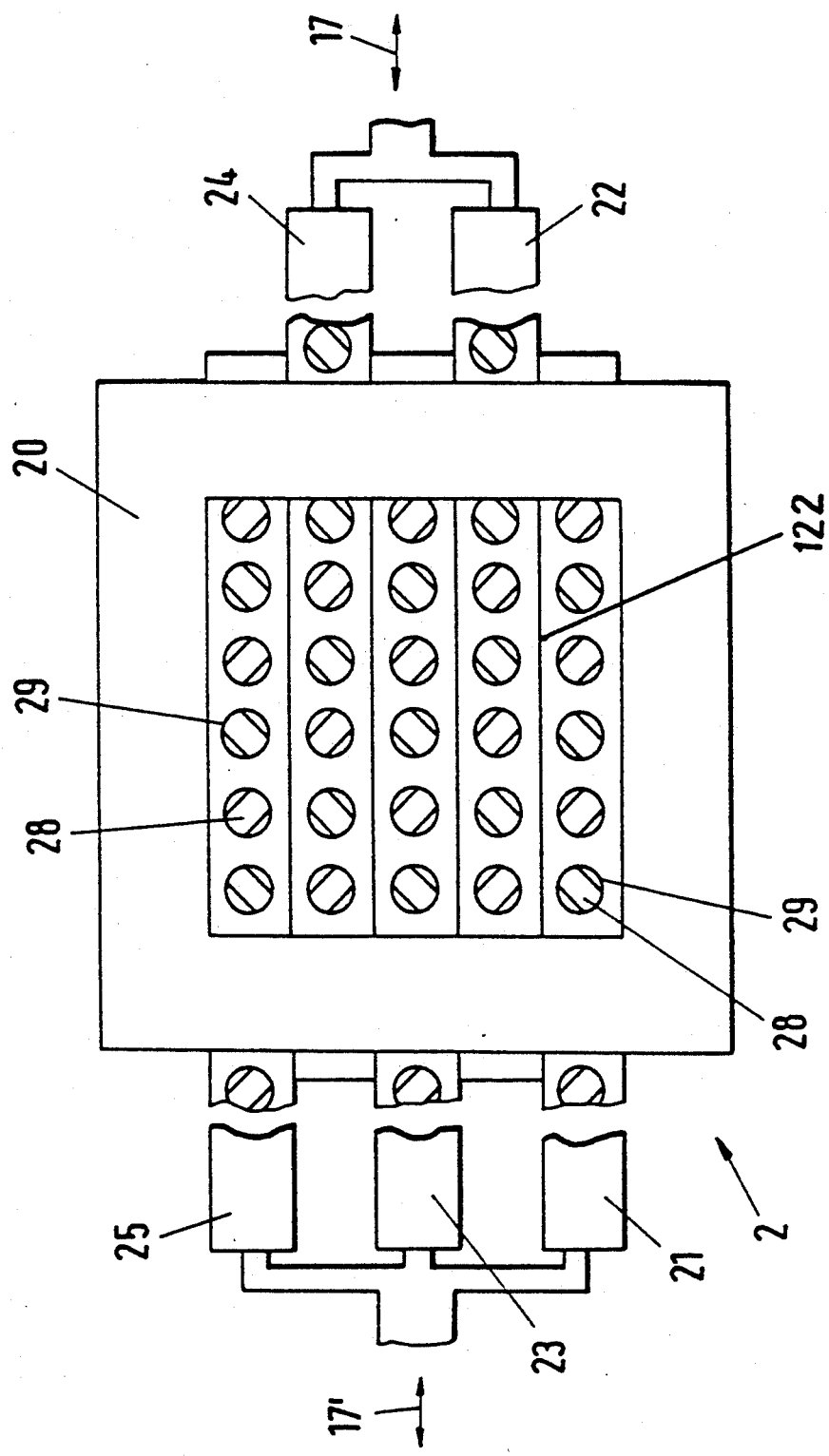

METHOD, APPARATUS AND EXTRUSION NOZZLE FOR PRODUCING A MEMBER FROM EXTRUDABLE MATERIAL

The invention relates to a method apparatus for producing a member from extrudable material, and to members produced by the method.

Extruder plants are used to produce members from extrudable or continuously castable material, for example ceramic or synthetic plastic material, etc. The molded members are, in the case of ceramics, also fired or baked to preserve the final shape and strength of the ceramic material of the articles. In chemical processing, for example catalysis, extruded members with a parallel duct structure are termed monoliths.

These are produced in extruder plants in which the ducts in an extruder nozzle do not change position relative to one another.

Plants using known methods can in fact produce members with duct structures which are, for example, twisted spirally, but the relative positions of the ducts to one another remain the same. All the ducts, however, always adjoin the same ducts, so that the variety of member structures available is very limited. DE-OS 25 27 787 also discloses honeycomb extruded parts having a large number of narrow closed passage ducts which may also partly not run parallel. Here again, there cannot be any exchange between the individual closed ducts. For many applications, however, members with mutually crossing and open ducts are necessary or advantageous wherever the medium carried, for example a gas, a liquid, a free-flowing solid or a mixture, is to be mixed as thoroughly as possible or homogenised and at the same time directed outwards from the interior of the member, for example in order to heat or cool the flowing medium on the outside walls of a column and, in particular, for optimal uniform and complete progress of the required reactions, mass transfer and changes of state in chemical reaction columns, mixers and catalyst systems. In such cases it is necessary for the entire contents of all the ducts to be completely and uniformly continually re-mixed over the entire crosssection of a member. This, however, is generally impossible with closed ducts of arbitrary shape.

Member structures with e.g. mutually crossing ducts have previously been made by subsequently assembling a plurality of, for example, extruded parts made from ceramic or plastic material. The additional operation of subsequent connection and e.g. bonding or re-baking of the connection points, alone, demands considerable effort or expense. In addition, the connection points may be mechanically and/or chemically weak (corrosion).

Accordingly, it is an object of the invention to create an extruder method which can produce members with duct structures having mutually crossing open ducts by extrusion and which does not require subsequent assembly and connection of the layers or plies of the structure with the ducts.

It is another object of the invention to provide a relatively simple apparatus for producing a multi-layer member with mutually crossing ducts.

It is another object of the invention to provide an extruder nozzle for making members extruded with crossing ducts.

It is another object of the invention to perform a multilayer member with crossing ducts in a single extrusion operation.

Briefly, the invention provides an extrusion apparatus comprising a barrel for movement of a flowable mass therethrough and a nozzle at one end of the barrel for extrusion of the flowable mass therethrough wherein the nozzle has at least three segments disposed in contact with each other and with each section having a plurality of extrusion ducts in communication with the barrel in order to extrude streams of the flowable mass therethrough. In addition, a drive means is provided for moving at least one of the nozzle segments relative to the other nozzle segments during extrusion of the streams of flowable mass through the extrusion ducts.

The extrusion apparatus also includes a control unit for actuating the drive means and a cutting device disposed adjacent an outlet end of the nozzle for cutting an extruded mass passing therefrom. The cutting device may also be connected to the control unit for actuation in synchronism with the operation of the drive means.

In one embodiment, the segments of the extrusion nozzle are flat. In addition, each segment is provided with a plurality of parallel longitudinally extending portions of predetermined cross-sectional shape to define the extrusion ducts. In this case, the longitudinally extending portions define a plurality of spaced apart internally disposed walls of predetermined shape with the extrusion ducts therebetween. For example, the extrusion ducts may be of rectilinear cross-sectional shape where the longitudinal extending portions are each of triangular cross-sectional shape.

Where the longitudinally extending portions are disposed on opposite sides of a respective nozzle segment, the extrusion ducts may be positioned angularly so as to communicate with adjacent extrusion ducts and thus define a continuous line which extends across the segment in an undulating manner. Further, the longitudinally extending portions are spaced apart to define open zones therebetween in order to selectively communicate with open zones of an adjacent nozzle segment during relative movement between the segments. Each open zone may be of a transverse width less than a transverse width of an adjacent segment portion.

The invention also provides an extrusion method which comprises the steps of extruding a flowable mass of hardenable material through a nozzle having at least three segments disposed in contact with each other and with each segment having a plurality of extrusion ducts for extruding streams of the flowable mass therethrough and moving at least one of the segments relative to the other of the segments during extrusion of the flowable mass in order to form an extruded member having extruded sections disposed in crossing relation. In this respect, one segment of the nozzle may be moved transversely of the direction of extrusion. Also, at least two of the nozzle segments may be moved relative to each other transversely of the direction of extrusion.

The extrusion method is conducted such that the nozzle segments may be moved symmetrically relative to an axis or plane running at least approximately perpendicular to the direction of extrusion. Likewise, at least one section of the nozzle may be moved in dependence on the value of the extrusion velocity. Still further, the nozzle segments may be moved with a periodic sinusoidal motion wherein the amplitude of the periodic movement corresponds substantially to the width of the nozzle and the extruded member produced.

The operation of the extrusion apparatus is such that an extruded member can be produced of multi-layer construction which each layer corresponding to a nozzle segment. Further, where the extrusion ducts extend in an undulating manner across the width of the nozzle segment, the resulting extruded member has a plurality of open ducts formed therein. Due to the open zones of the nozzle segments, the ducts of one layer are able to communicate with the ducts of an adjacent layer in the final extruded member.

One advantage of the extrusion apparatus is at least three nozzle segments which abut without gaps and which are movable relative to one another, so giving inter alia economic savings in time and costs. These advantages also apply compared with known methods using volatile or releasable molds.

The motion of the segments of the extruder nozzle (the tool proper) may advantageously be controlled in dependence on the extrusion velocity. Alternatively, however, the segments of the extruder nozzle might be controlled independently of the extrusion velocity, so that, as required, a large number of member structures with ducts or other structural features could be made from ceramic material or plastics simply and very economically.

BRIEF DESCRIPTION OF THE DRAWINGS

These and other objects and advantages of the invention will become more apparent from the following detailed description taken in conjunction with the accompanying drawings wherein:

FIG. 2 is a front elevation of extruder nozzle in accordance the invention;

FIG. 3 shows the rear view of the extruder nozzle shown in FIG. 2;

Referring to FIG. 1, the extrusion apparatus 1 includes a barrel 13 for movement of a flowable hardenable mass therethrough, a rotatable screw 11 for advancing the flowable mass through the barrel 13 and an extruder nozzle 2 mounted at an outlet 10 the barrel 13.

Figure 1:
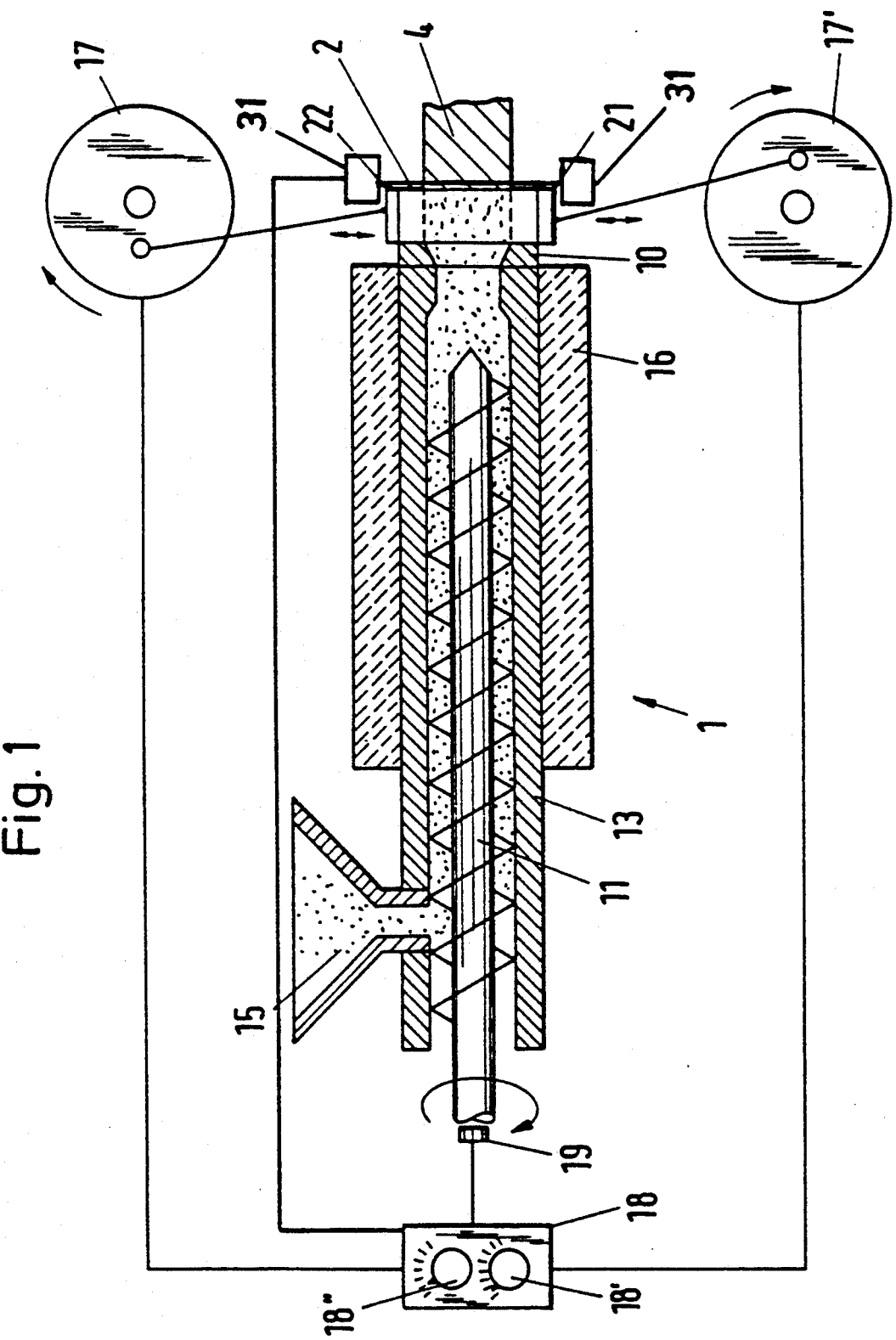
FIG. 1 is a basic diagram of an extrusion apparatus embodying the invention.

The material is to be extruded may for example be a ceramic material or a synthetic plastic material, such as a thermosetting plastic, thermoplastic or elastomer. For processing materials affected by heat, the extruder barrel 13 and/or extruder nozzle 2 may be provided with heater 16.

A control unit 18 is also disposed in the extruder 1 and is connected with a revolution counter 19 which serves to count the number of revolutions of the extruder screw 11.

Referring to FIG. 2, the extruder nozzle 2 is constructed with a multiplicity of nozzle segments, for example five segments 21, 22, 23, 24, 25 which are disposed in contact with each other. As indicated, each segment 21-25 is flat and has a plurality of extrusion ducts 28 in communication with the barrel 13 in order to extrude streams of the flowable mass therethrough. As indicated in FIG. 3, each extrusion duct 28 communicates via a bore 29 with the interior of the barrel 13.

As indicated in FIGS. 2 and 3, connecting means 26, 27 are connected to alternating nozzle segments 21-25 so that the segments may be moved in common relative to each other. As indicated, one connecting means 26 is connected to two nozzle segments 22, 24 while the other connecting means 27 is connected to three nozzle segments 21-23, 25.

As further indicated in FIG. 2, the nozzle segments 21-25 are disposed in a common frame 20 so as to be slidable relative to each other. In addition, the frame 20 is provided with an opening of a width V to represent the lateral width of an extruded member 4 (see FIG. 1) which is to be extruded. Further, the respective nozzle segments 21-25 are movable over a stroke A as indicated in FIG. 2.

The segments 21-25 of the extruder nozzle may for example be reciprocated by means of eccentric drives 17, 17', as illustrated here. The associated regulation and control unit 18 controls the rotational speed of the eccentric drives 17, 17' and hence the reciprocation according to the rotational speed of the extruder screw 11. Adjustment means 18', 18'' allow the movements of the segments of the extruder nozzle 2 to be set individually within wide limits, so that members 4 of very varied shapes can be extruded from extrudable material.

Figure 3B:
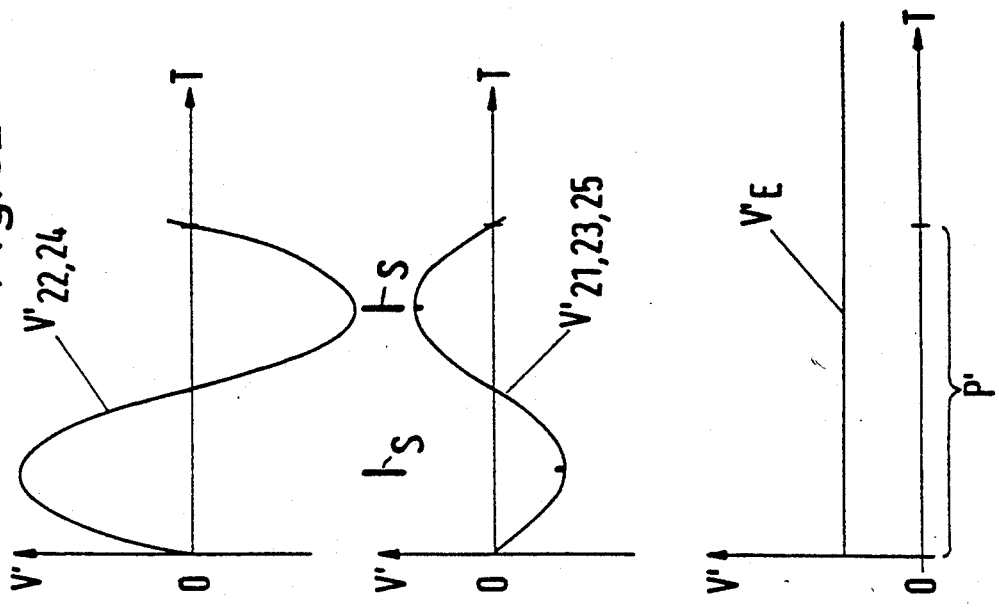
FIGS. 3A and 3B represents examples of velocity curves for possible cycles of motion of individual segments and/or groups of segments of extruder nozzles as shown in FIGS. 2 and 3, and for the extrusion velocity.
Figure 3A:
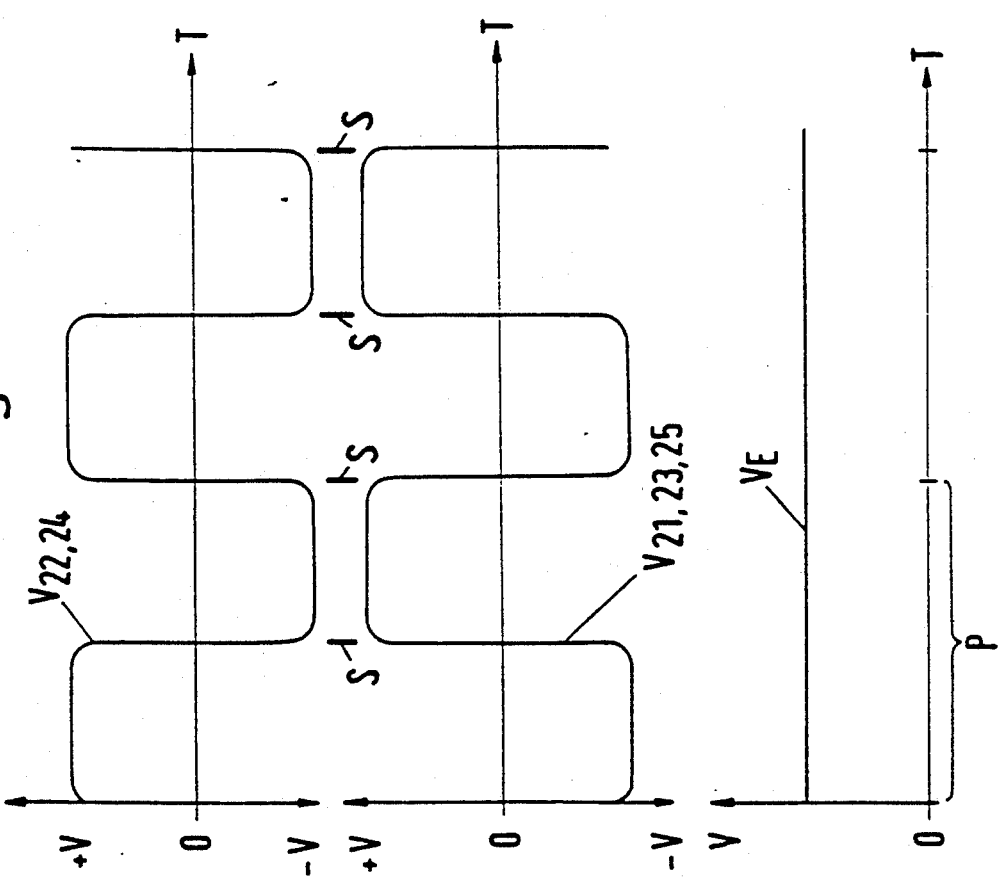

A cutting device 31 is disposed immediately at the outlet of the nozzle 2 to divide the member 4 into parts of the required type and length. By means of the control unit 18, the cutting device 31 can, more particularly, be so controlled that on each change of direction of the nozzle movement a cut S is carried out. This results in member portions with ducts 40 (FIG. 4) which correspond to the extrusion ducts 28 of the segments and which extend in only one direction. As shown in FIGS. 3A, 3B and 5, such cuts S take place on reversal of the direction of movement of the segments, i.e., in the end positions of the periodic segment movement effected by the eccentric drives 17, 17'.

Alternatively, of course, the nozzles segments might be moved not by the two eccentric drives 17, 17', but by a single drive and/or other drive means, such as linear motors, cam discs, etc. There is moreover no need for movements of the segments to be symmetrical. The drive for the segments may moreover be independent of the rotational speed of the extruder screw 11, which further increases the variety of extrusion members 4 which can be made.

Referring to FIG. 2, the nozzle segments abut one another at the boundary surfaces 122, 223, 324, 425 without gaps. As noted above, each group of first segments 21, 23, 25 or second segments 22, 24 is connected by respective connecting means 26, 27, so that the drives 17, 17' can move the groups of segments (21, 23, 25) and (22, 24) relative to one another. The extrusion ducts 28 are here designed to extrude a member like that shown in FIG. 4, if the motion of the segments is uniform as represented in FIG. 3A. When the extrusion ducts 28 of the segments 21 to 25 are in the illustrated positions relative to one another, the extrusion ducts adjoining one another form connecting zones 2122, 2223, 2324, 2425.

Figure 2A:
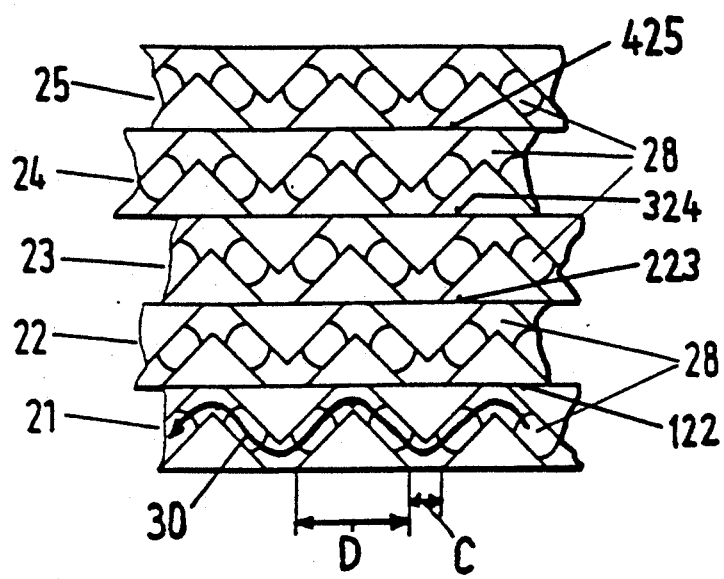
FIG. 2A illustrates the segments in the extruder nozzle of FIG. 2 with extrusion ducts in a different relative position compared with FIG. 2.

FIG. 2A shows the groups of segments (21, 23, 25) and (22, 24) from FIG. 2 with the extrusion ducts 28 in a different relative position, without connecting zones.

Referring to FIG. 2, each nozzle segment is formed with a plurality of parallel longitudinally extending portions of predetermined cross-sectional shape, such as a triangular shape, in order to define the extrusion ducts 28 therebetween. As indicated, the triangular shaped portions define internally disposed walls within the nozzle segment in order to define the extrusion ducts 28, each of which is of a rectilinear (rectangular) cross-sectional shape. Further, the longitudinally extending portions are disposed on opposite sides of the segment and are spaced apart on each side to define the open connecting zones 2122, 2223, 2324, 2425, respectively. As described below, the open zones of each segment selectively communicate with the open zones of an adjacent nozzle segment during relative movement of the segments. Further, each open zone is of a transverse width C (see FIG. 2A) less than a traverse width D of an adjacent segment portion. As indicated in FIG. 2a, the extrusion ducts 28 of each segment 21-25 define a continuous line 30 which extends across the segment in an undulating manner in order to produce members having open crossed ducts 40 (see FIG. 4). As indicated, the line 30 extends to and fro between the boundary surfaces 122, 223, 324, 425.

Figure 2B:
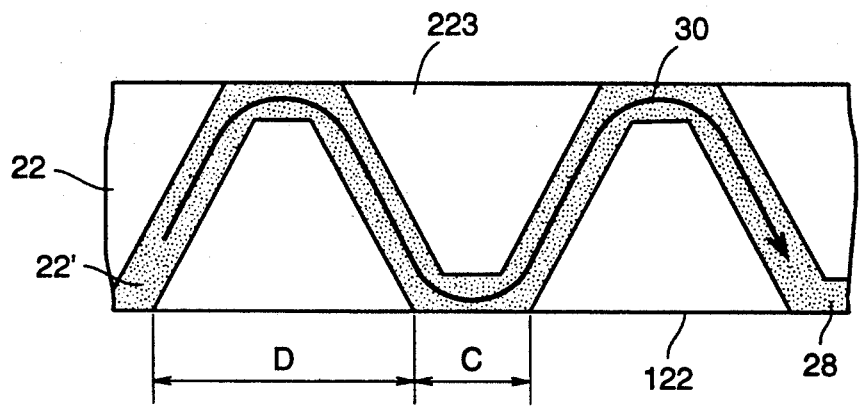
FIGS. 2B and 2C show other examples of extrusion ducts of the segments.
Figure 2C:
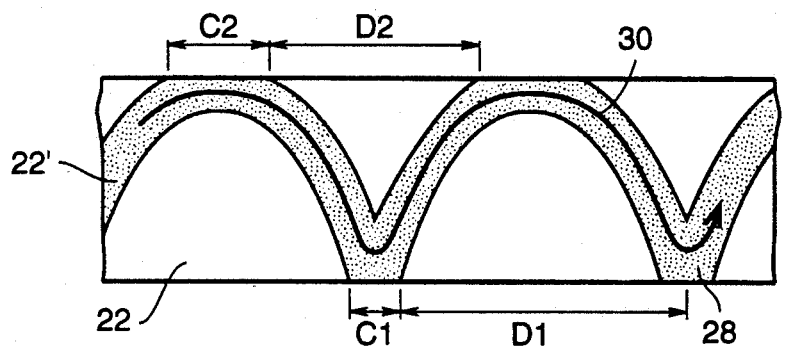

FIGS. 2B and 2C show other possible forms of the extrusion ducts which may, for example, in part extend rectilinearly, curvilinearly or asymmetrically. Stable self-supporting layers 21', 22', 23' of three-dimensional structure, which should not experience further deformation after the extrusion of relatively soft material, can be produced in this case by oblique extrusion ducts 28 which do not extend at right angles to the boundary surfaces. Advantageously, the open zones C of the extrusion ducts in the boundary surfaces are for stability reasons not made too small, but they are made smaller than the closed zones D which correspond to the open ducts 40 (FIG. 4) of the extrusion members. As shown in FIG. 2C, these zones may also differ in a segment, for example, the zones C1, D1 of the bottom boundary surface differ from those (C2, D2) of the top boundary surface.

FIGS. 3A and 3B represent examples of velocity/time curves (V, T) and (V', T) respectively for the segment groups, with $V_{21, 23, 25}$ and $V'_{21, 23, 25}$ respectively for the group (21, 23, 25), and with $V_{22, 24}$ and $V'_{21, 24}$ respectively for the group (22, 24), as well as the associated extrusion velocity diagrams $V_E(T)$ and $V'_E(T)$. The period of the cycle of motion is designated P or P' respectively. In FIG. 3A the two segment groups are moved in opposite directions and at a substantially constant velocity. This produces members like that shown in FIG. 4 if the periodicity P is so selected that the length of the extruded body 4 corresponds—as a result of appropriate cuts S by the cutting device 31—to a half period P in which the segment velocities $V_{22, 24}$ and $V_{21, 23, 25}$ are constant. This setting is particularly suitable for producing regular packings, for example for static mixers. FIG. 3B represents an—also opposite—sinusoidal velocity curve for the two segment groups, but with different amplitudes. It would also be possible, of course, to vary the extrusion velocity and/or the period and/or the pattern of movement. For many uses of the members 4, it is advantageous if the structure of the ducts 40 (see FIG. 4), does not exceed an angle of for example 45° to the direction of extrusion, in order to achieve a high mixing and homogenization effect with relatively low flow resistance.

In the portion of a member of this kind shown in FIG. 5, the amplitude A of the segment movement moreover corresponds exactly to the width B of the member or of the nozzle 2. Crossed open ducts 40 then form, which extend substantially rectilinearly through the entire member 4.

Figure 4:
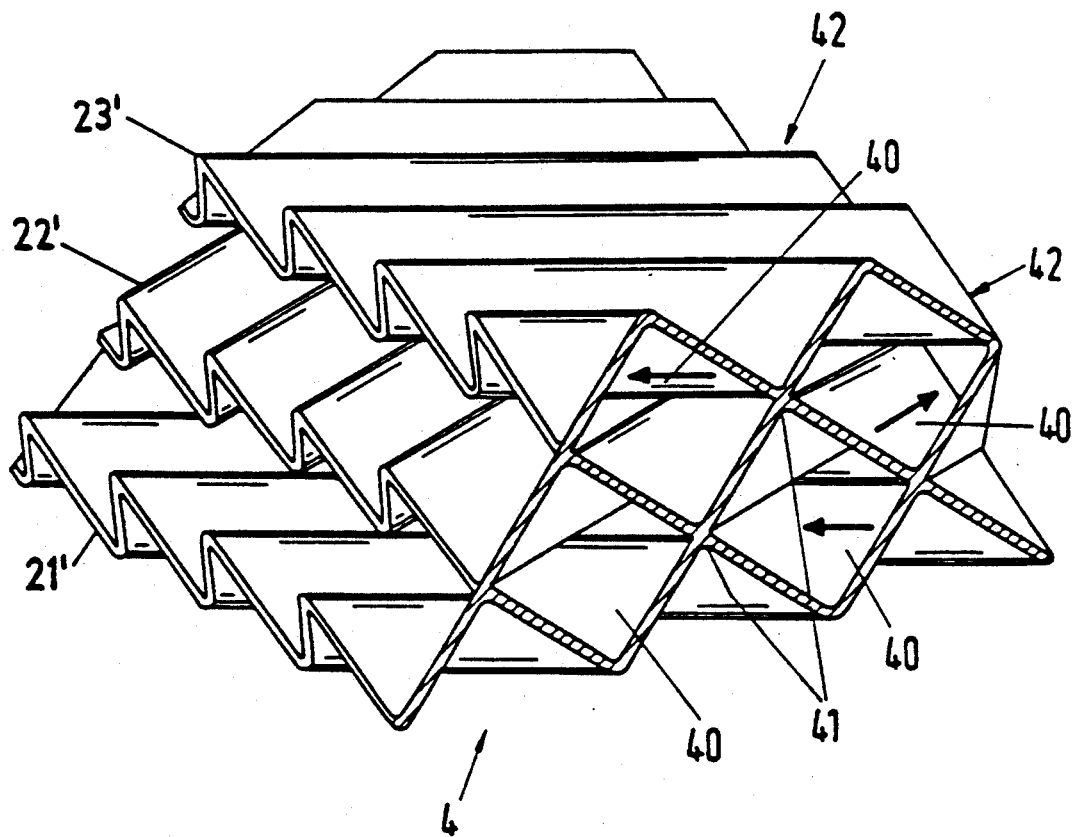
FIG. 4 illustrates an embodiment of and extruded member with open crossed ducts which can be produced by the method in accordance with the invention with an extruder nozzle of the type shown in FIGS. 2 and 3.
Figure 5:
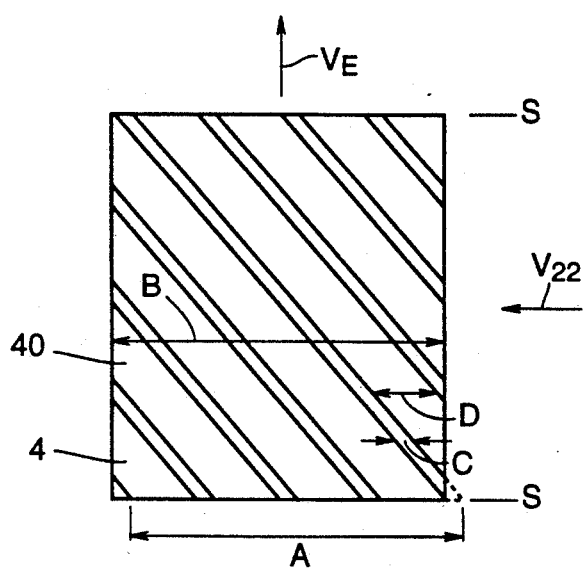
FIG. 5 is a part of a member with open crossed ducts.

Finally, FIG. 4 shows an extruded or continuously cast member 4 in the form of a static mixer with open mutually crossing ducts 40 running from the interior of the member outwards to an open side boundary surface 42 of the member and vice versa. The layers 21', 22', 23' correspond to the segments 21, 22, 23 of the nozzle 2. The connection points 41, which correspond to the connection points 2122, 2223 in FIG. 2, are in this body 4, if it is produced by the method in accordance with the invention, particularly strong mechanically and chemically, especially in comparison to conventional connections made subsequently between the layers, for example, by baking, bonding or the like.

By means of the shape of extrusion ducts 28 in the extruder nozzle 2 and the movement and coupling of the segments 21, 22, 23, 24, 25 it is possible to produce members of the most varied types, with the most varied shapes of ducts 40, in a single extrusion operation.

For example, for catalytic reactions it is a simple matter to produce advantageous catalyst members with good mixing and reaction properties, good heat dissipation and without slip, for example by making the member 4 itself produced from a porous material which acts as a catalyst, or by using the member 4 as a supporting structure and coating it, for example by wash coating, with a surface layer which acts as a catalyst. For use as static mixers, members 4 advantageously have a glaze as a protective layer, partly to combat abrasion or corrosion and partly to render the surface smooth and so reduce flow resistance.

We claim:

1. An extrusion apparatus comprising
    a barrel for movement of a flowable mass therethrough;
    a nozzle at one end of said barrel for extrusion of the flowable mass therethrough, said nozzle having at least three segments with boundary surfaces wherein the segments contact each other without gaps between the boundary surfaces, each said segment having a plurality of extrusion ducts in communication with said barrel to extrude streams of the flowable mass therethrough wherein the extrusion ducts of each segment define a continuous line that extends to and fro between the boundary surfaces; and
    drive means for moving at least one of said segments relative to the other of said segments during extrusion of the streams of flowable mass through said extrusion ducts.

2. An extrusion apparatus as set forth in claim 1 which further comprises a control unit for actuating said drive means.

3. An extrusion apparatus as set forth in claim 2 which further comprises a cutting device disposed adjacent an outlet end of said nozzle for cutting an extruded mass passing therefrom, said cutting device being connected to said control unit for actuation in synchronism with the operation of said drive means.

4. An extrusion apparatus as set forth in claim 1 wherein said segments are flat.

5. An extrusion apparatus as set forth in claim 1 wherein each extrusion duct is disposed angularly with respect to the boundary surfaces of said respective segment to communicate with adjacent extrusion ducts at a respective side thereof.

6. An extrusion apparatus as set forth in claim 5 wherein said extrusion ducts of each segment define a continuous line extending across said segment in an oscillating manner.

7. An extrusion apparatus as set forth in claim 1 further comprising a connecting means connected to at least a pair of said segments and to said drive means for movement of said pair of segments in unison relative to the remainder of said segments.

8. An extrusion apparatus as set forth in claim 1 which comprising a screw in said barrel for advancing the flowable mass through said barrel and said nozzle and a control unit connected between said screw and said drive means for controlling the operation of said drive means in dependence of the speed of said screw.

9. An extrusion nozzle comprising at least three segments with boundary surfaces wherein the segments contact each other without gaps between the boundary surfaces, each segment having a plurality of extrusion ducts to extrude streams of a flowable mass therethrough, wherein the extrusion ducts of each segment define a continuous line that extends to and fro between the boundary surfaces of the segment.

10. An extrusion nozzle as set forth in claim 9 wherein each segment has a plurality of spaced apart internally disposed walls of predetermined shape defining said extrusion ducts therebetween.

11. An extrusion nozzle as set forth in claim 10 wherein said walls define extrusion ducts of rectilinear cross-sectional shape.

12. An extrusion nozzle as set forth in claim 9 wherein each segment has a plurality of longitudinally extending portions of predetermined cross-sectional shape defining said ducts therebetween and wherein said portions are disposed between the boundary surfaces on opposite sides of a respective segment and are spaced apart on each side to define open zones therebetween to selectively communicate with open zones of an adjacent segment during relative movement of said segments.

13. An extrusion nozzle as set forth in claim 12 wherein each said portion is of triangular cross-sectional shape.

14. An extrusion nozzle as set forth in claim 12 wherein said portions are disposed on opposite sides of a respective segment and are spaced apart on each side to define open zones therebetween to selectively communicate with open zones of an adjacent segment during relative movement of said segments.

15. An extrusion nozzle as set forth in claim 12 wherein each open zone is of a transverse width less than a transverse width of an adjacent segment portion.

16. An extrusion method comprising the steps of
extruding a flowable mass of hardenable material through a nozzle having at least three segments having boundary surfaces with the segments contacting each other without gaps between the boundary surfaces and with each segment having a plurality of extrusion ducts to extrude streams of the flowable mass therethrough, wherein the extrusion ducts of each segment define a continuous line that extends to and fro between the boundary surfaces; and
moving at least one of said segments relative to the other of said segments during extrusion of the streams of flowable mass through said extrusion ducts to form an extruded member having extruded sections disposed in crossing relation.

17. A method as set forth in claim 16 wherein said one segment is moved transversely of the direction of extrusion.

18. A method as set forth in claim 16 wherein at least two of said segments are moved relative to each other transversely of the direction of extrusion.

19. A method as set forth in claim 16 wherein every second segment of said nozzle is moved in unison.

20. A method as set forth in claim 16 wherein said segments of said nozzle are moved symmetrically relative to an axis running at least approximately perpendicularly to the direction of extrusion.

21. A method as set forth in claim 16 wherein at least one segment of said nozzle is moved in dependence on the value of the extrusion velocity.

22. A method as set forth in claim 16 wherein at least one segment is moved with a periodic oscillating motion.

23. A method as set forth in claim 22 wherein the amplitude of said periodic movement corresponds substantially to the width of said nozzle and the extruded member produced.

24. A method as set forth in claim 22 which further comprises the step of cutting the extruded member at each of the end positions of said periodic movement.

* * * * *

UNITED STATES PATENT AND TRADEMARK OFFICE
CERTIFICATE OF CORRECTION

PATENT NO. : 5,240,663

DATED : August 31, 1993

INVENTOR(S) : Stringaro et al.

It is certified that error appears in the above-identified patent and that said Letters Patent is hereby corrected as shown below:

Column 1, line 6, after "method" insert --and--;
         line 44, change "crosssection" to --cross-section--;

Column 2, line 1, change "perform" to --produce--;

Column 3, line 3, change "which" to --with--;
         line 48, change "and" to --an--;
         line 58, after "10" insert --of--;
         line 59, change "is" to --15--;

Column 6, line 33, change "produced" to --produce--; and

Column 7, line 19, delete "which".

Signed and Sealed this

Thirtieth Day of August, 1994

Attest:

BRUCE LEHMAN

Attesting Officer      Commissioner of Patents and Trademarks